(12) United States Patent
Dudar

(10) Patent No.: US 10,040,390 B2
(45) Date of Patent: Aug. 7, 2018

(54) VEHICLE LIGHT DIAGNOSTIC

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 135 days.

(21) Appl. No.: 15/290,418

(22) Filed: Oct. 11, 2016

(65) Prior Publication Data

US 2018/0099606 A1  Apr. 12, 2018

(51) Int. Cl.
*H05B 37/02* (2006.01)
*B60Q 1/14* (2006.01)

(52) U.S. Cl.
CPC ........ *B60Q 1/1423* (2013.01); *B60Q 2300/41* (2013.01)

(58) Field of Classification Search
CPC .. G05D 1/0055; H05B 37/02; H05B 37/0227; H05B 37/0272; H05B 33/08; H05B 33/0845; B60Q 1/1423; B60Q 2300/41; B60Q 1/143; B60Q 1/1461
USPC .... 315/77–82, 129–134, 150–152, 291, 307, 315/308, 312
See application file for complete search history.

(56) References Cited

U.S. PATENT DOCUMENTS

| | | | |
|---|---|---|---|
| 7,005,977 B1 | 2/2006 | Tengler et al. | |
| 7,227,611 B2 | 6/2007 | Hull et al. | |
| 7,440,828 B2 | 10/2008 | Tooyama | |
| 8,582,091 B2 | 11/2013 | Ekladyous et al. | |
| 8,660,734 B2 * | 2/2014 | Zhu | G05D 1/0055 701/23 |
| 2011/0063861 A1 * | 3/2011 | Edgeworth | B60Q 1/143 362/466 |
| 2013/0113935 A1 | 5/2013 | Naik et al. | |
| 2013/0257274 A1 | 10/2013 | Sekiguchi | |
| 2014/0085468 A1 | 3/2014 | Faber et al. | |
| 2014/0226349 A1 | 8/2014 | Morishita et al. | |
| 2016/0003439 A1 | 1/2016 | Schmidt et al. | |

FOREIGN PATENT DOCUMENTS

| | | |
|---|---|---|
| DE | 102011118534 A1 | 2/2013 |
| KR | 20130055836 A | 5/2013 |

OTHER PUBLICATIONS

UK Search Report dated Mar. 3, 2018 re GB Appl. No. 1716088.8.

* cited by examiner

*Primary Examiner* — Jimmy Vu

(74) *Attorney, Agent, or Firm* — Frank A. MacKenzie; Bejin Bieneman PLC

(57) ABSTRACT

A first vehicle includes a light and a controller in communication with the light. The controller is programmed to detect a second vehicle positioned to sense the light, transmit a first message to the second vehicle requesting observation of the light, actuate the light to change state in response to a second message from the second vehicle, and receive a third message from the second vehicle specifying a state of the light.

20 Claims, 7 Drawing Sheets

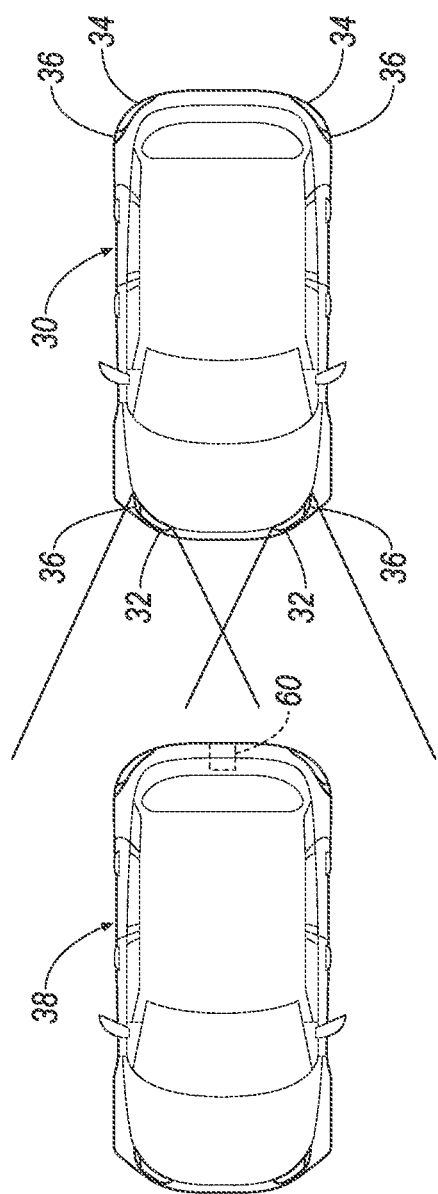
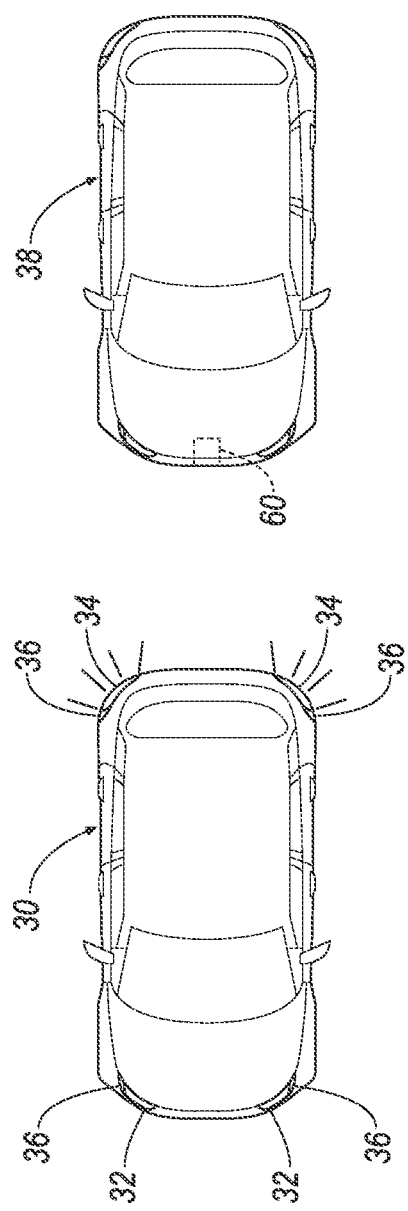

VEHICLE LIGHT DIAGNOSTIC

BACKGROUND

Motor vehicles include exterior lights to illuminate the environment and to signal to other vehicles. Headlights are attached to a front of the vehicle facing in a vehicle-forward direction. Headlights typically produce white light and illuminate a roadway in front of the vehicle. Brakelights are attached to a rear of the vehicle facing in a vehicle-backward direction and typically produce red light. Turn signals are attached at or near corners of the vehicle and typically produce yellow or orange light. Some brakelights are also turn signals. Brakelights communicate to other vehicles whether the vehicle is braking, and turn signals communicate to other drivers whether a vehicle intends to turn. Turn signals also function as four-way flashers and communicate to other vehicles that the vehicle is moving slowly, a hazardous situation is ahead, etc. Types of lights for vehicles include tungsten, halogen, high-intensity discharge (HID) such as xenon, light-emitting diode (LED), and laser.

BRIEF DESCRIPTION OF THE DRAWINGS

FIG. 4 is a diagram of an example second vehicle positioned relative to the first vehicle of FIG. 1.

FIG. 5 is another diagram of the second vehicle of FIG. 4 positioned relative to the first vehicle of FIG. 1.

DETAILED DESCRIPTION

Figure 1:
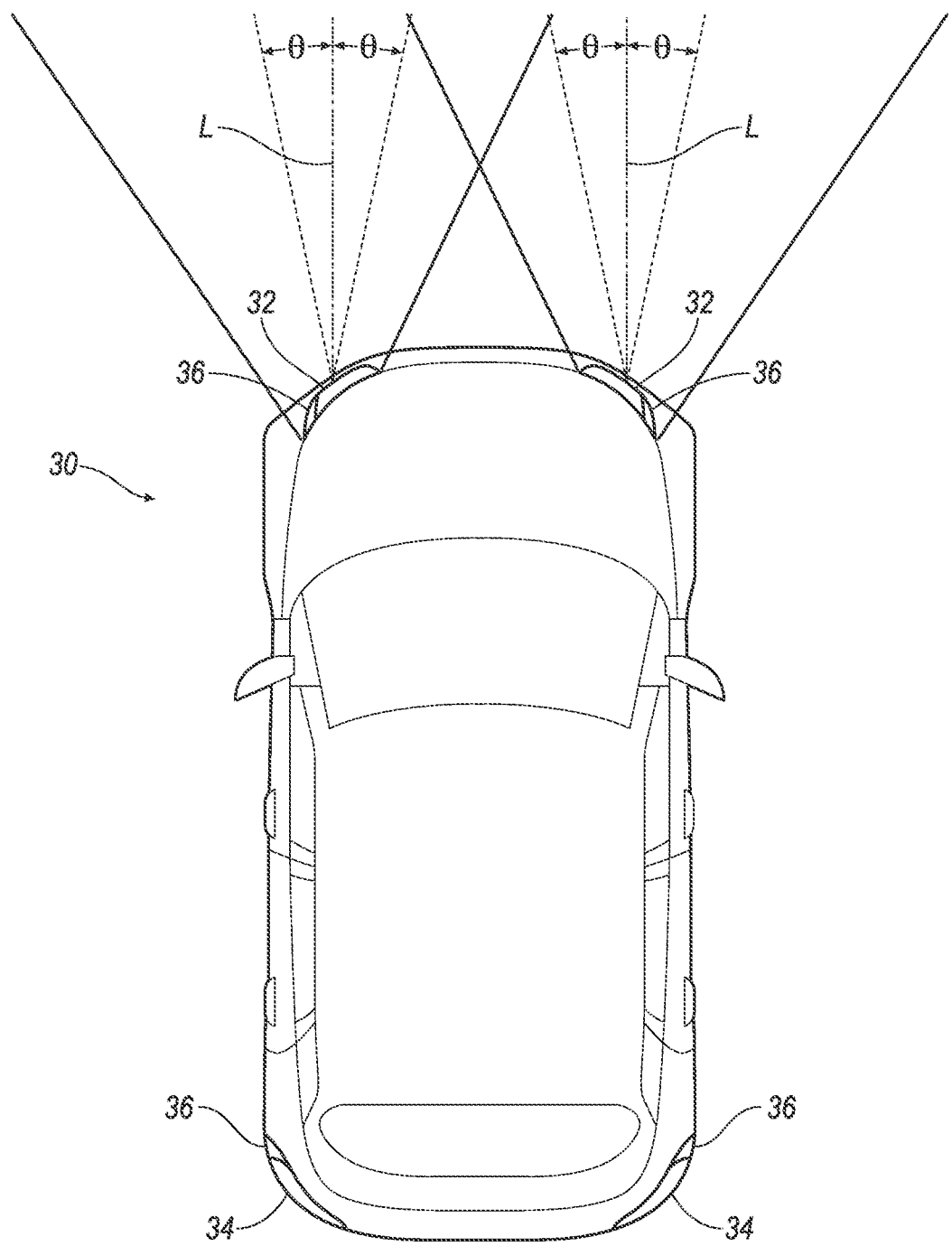
FIG. 1 is a top view of an example first vehicle.

With reference to the Figures, wherein like numerals indicate like parts throughout the several views, a first vehicle 30 includes a light 32, 34, 36 and a controller 42 in communication with the light 32, 34, 36. The controller 42 is programmed to detect a second vehicle 38 positioned to sense the light 32, 34, 36; transmit a first message to the second vehicle 38 requesting observation of the light 32, 34, 36; actuate the light 32, 34, 36 to change state in response to a second message from the second vehicle 38; and receive a third message from the second vehicle 38 specifying a state of the light 32, 34, 36. (The adjectives "first," "second," "third," and "fourth" are used throughout this document for convenience as identifiers and are not intended to signify importance or order.)

An autonomous first vehicle 30 may be operated without occupants or carrying occupants who do not provide input to operate the first vehicle 30. Thus, if one of the exterior lights 32, 34, 36 of the vehicle malfunctions, no occupant may be present or willing to seek repairs for the light 32, 34, 36. The programming of the controller 42 advantageously solves the problem of diagnosing the lights 32, 34, 36 of an autonomous vehicle.

The first vehicle 30 may be an autonomous vehicle. The controller 42, sometimes referred to as the "virtual driver," may be capable of operating the first vehicle 30 independently of the intervention of a human driver, entirely or to a greater or a lesser degree. The controller 42 may be programmed to operate propulsion 44, braking 46, steering 48, and/or other vehicle systems. The first vehicle 30 is considered to be fully autonomous (sometimes referred to as autonomous) when the controller 42 operates each of the propulsion 44, the braking 46, and the steering 48 without human intervention.

Figure 2:
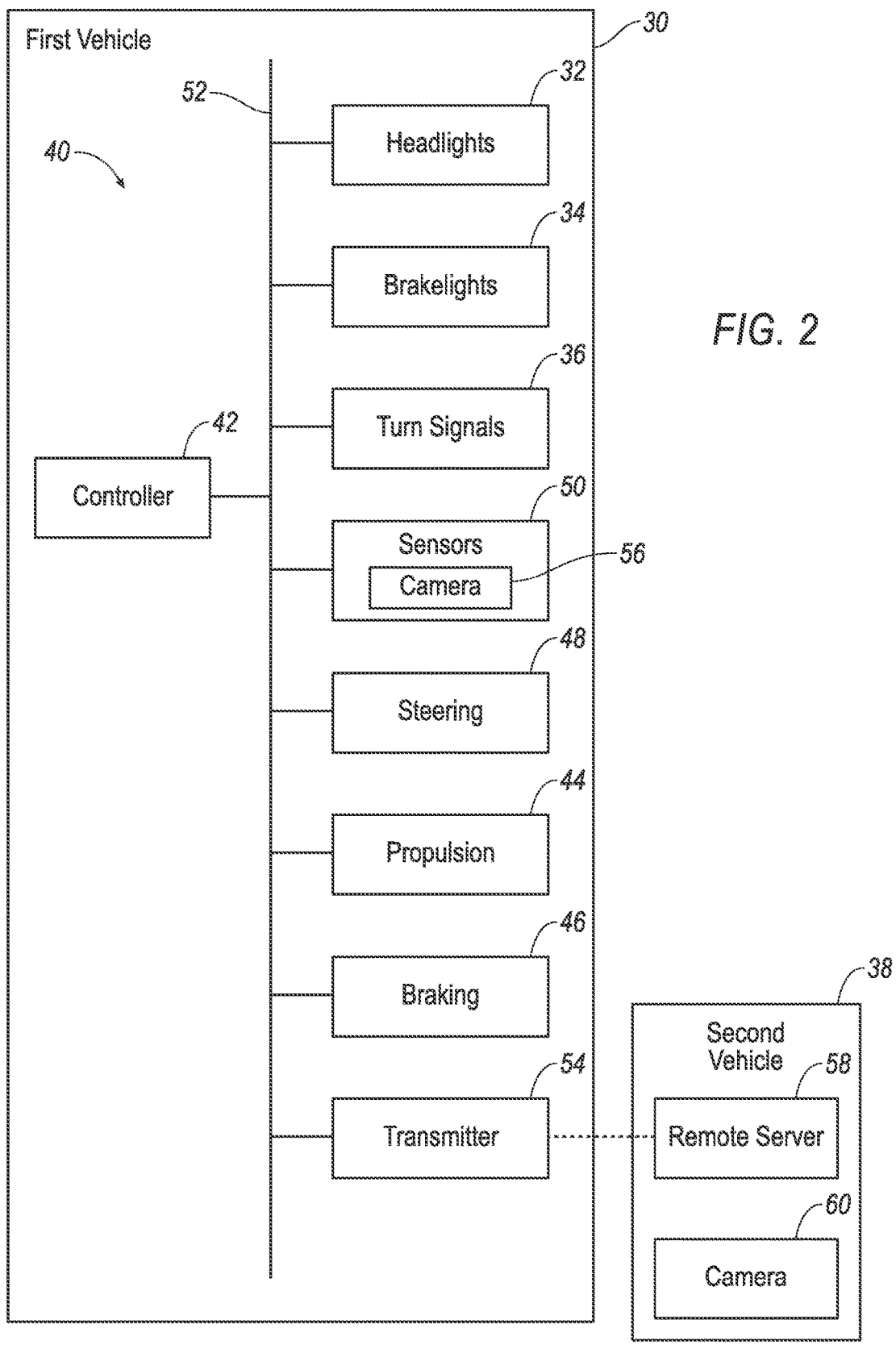
FIG. 2 is a block diagram of a control system of the first vehicle of FIG. 1.

With reference to FIG. 2, the controller 42 is included in a control system 40 for carrying out various operations, including as described herein. The controller 42 is a computing device that generally includes a processor and a memory, the memory including one or more forms of computer-readable media, and storing instructions executable by the processor for performing various operations, including as disclosed herein. The memory of the controller 42 further generally stores remote data received via various communications mechanisms; e.g., the controller 42 is generally configured for communications on a controller area network (CAN) bus or the like, and/or for using other wired or wireless protocols, e.g., Bluetooth, etc. The controller 42 may also have a connection to an onboard diagnostics connector (OBD-II). Via a vehicle network using Ethernet, WiFi, the CAN bus, Local Interconnect Network (LIN), and/or other wired or wireless mechanisms, the controller 42 may transmit messages to various devices in the vehicle and/or receive messages from the various devices, e.g., controllers, actuators, sensors, etc., e.g., controllers and sensors as discussed herein. For example, the controller 42 may receive data from sensors 50. Although one controller 42 is shown in FIG. 1 for ease of illustration, it is to be understood that the controller 42 could include, and various operations described herein could be carried out by, one or more computing devices.

The control system 40 may transmit signals through a communications network 52 such as a controller area network (CAN) bus, Ethernet, Local Interconnect Network (LIN), and/or by any other wired or wireless communications network. The controller 42 is in communication through the communications network 52 with the propulsion 44, the braking 46, the steering 48, the sensors 50, a transmitter 54, and the lights 32, 34, 36.

The first vehicle 30 may include the sensors 50. The sensors 50 may detect internal states of the first vehicle 30, for example, wheel speed, wheel orientation, and engine and transmission variables. The sensors 50 may detect the position or orientation of the first vehicle 30, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 50 may detect the external world, for example, radar sensors, scanning laser range finders, light detection and ranging (LIDAR) devices, and image processing sensors such as cameras 56. The sensors 50 may include communications devices, for example, vehicle-to-infrastructure (V2I) or vehicle-to-vehicle (V2V) devices.

The steering 48 is typically a known vehicle steering subsystem and controls the turning of wheels. The steering 48 is in communication with and receives input from a steering wheel and the controller 42. The steering 48 may be a rack-and-pinion system with electric power-assisted steering, a steer-by-wire system, as are both known, or any other suitable system.

The propulsion 44 of the first vehicle 30 generates energy and translates the energy into motion of the first vehicle 30. The propulsion 44 may be a known vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 44 is in communication with and receives input from the controller 42 and from a human driver. The human driver may control the propulsion 44 via, e.g., an accelerator pedal and/or a gear-shift lever.

The braking 46 is typically a known vehicle braking subsystem and resists the motion of the first vehicle 30 to thereby slow and/or stop the first vehicle 30. The braking 46 may be friction brakes such as disc brakes, drum brakes, band brakes, and so on; regenerative brakes; any other suitable type of brakes; or a combination. The braking 46 is in communication with and receives input from the controller 42 and a human driver. The human driver may control the braking 46 via, e.g., a brake pedal.

The transmitter 54 may be connected to the communications network 52. The transmitter 54 may be adapted to transmit signals wirelessly through any suitable wireless communication protocol, such as Bluetooth, WiFi, 802.11a/b/g, radio, etc. The transmitter 54 may be adapted to communicate with a remote server 58, that is, a server distinct and geographically remote from the first vehicle 30. The remote server 58 may be located outside the first vehicle 30. For example, the remote server 58 may be in other vehicles (e.g., V2V communications), infrastructure components (e.g., V2I communications), emergency responders, mobile devices associated with the owner of the vehicle, etc. Further, the transmitter 54 can be used to allow the first vehicle 30 to communicate with second vehicles 38, i.e., for vehicle-to-vehicle (V2V) communicating.

With reference to FIG. 1, the first vehicle 30 includes headlights 32. The headlights 32 may be fixed relative to the first vehicle 30 and disposed at a front of the first vehicle 30 facing in a vehicle-forward direction. The headlights 32 may be any lighting system suitable for illuminating a roadway in front of the vehicle 30, including tungsten, halogen, high-intensity discharge (HID) such as xenon, light-emitting diode (LED), laser, etc. The headlights 32 may be stationary or adaptive, that is, capable of rotating relative to the first vehicle 30. The adaptive headlights 32 may rotate away from a longitudinal axis L of the first vehicle 30 by an angle θ to the left or to the right relative to longitudinal axis L of the first vehicle 30. The adaptive headlights 32 may be in communication with the controller 42, and the controller 42 may instruct the adaptive headlights 32 to rotate based on, for example, a steering angle, yaw rate, and/or speed of the first vehicle 30.

The first vehicle 30 includes brakelights 34. The brakelights 34 may be fixed relative to the first vehicle 30 and disposed at a rear of the first vehicle 30 facing in a vehicle-backward direction. The brakelights 34 may be any lighting system suitably visible to other vehicles around the first vehicle 30, including tungsten, halogen, high-intensity discharge (HID) such as xenon, light-emitting diode (LED), laser, etc. The brakelights 34 may have multiple states, and the multiple states may include bright, dim, and off. For example, the brakelights 34 may be bright if the braking 46 is activated, dim if the braking 46 is not activated and the headlights 32 are on, and off if the braking 46 is not activated and the headlights 32 are off. The brakelights 34 may be in communication with the braking 46 and/or the controller 42.

The first vehicle 30 includes turn signals 36. The turn signals 36 may be fixed relative to the first vehicle 30 and disposed at corners of the first vehicle 30 as well as, for example, on side mirrors and/or doors of the first vehicle 30. The turn signals 36 may be any lighting system suitably visible to other vehicles around the first vehicle 30, including tungsten, halogen, high-intensity discharge (HID) such as xenon, light-emitting diode (LED), laser, etc. The turn signals 36 may have multiple states, and the multiple states may include blinking and off. The turn signals 36 may be in communication with the controller 42. The brakelights 34 may also be turn signals 36.

Figure 3:
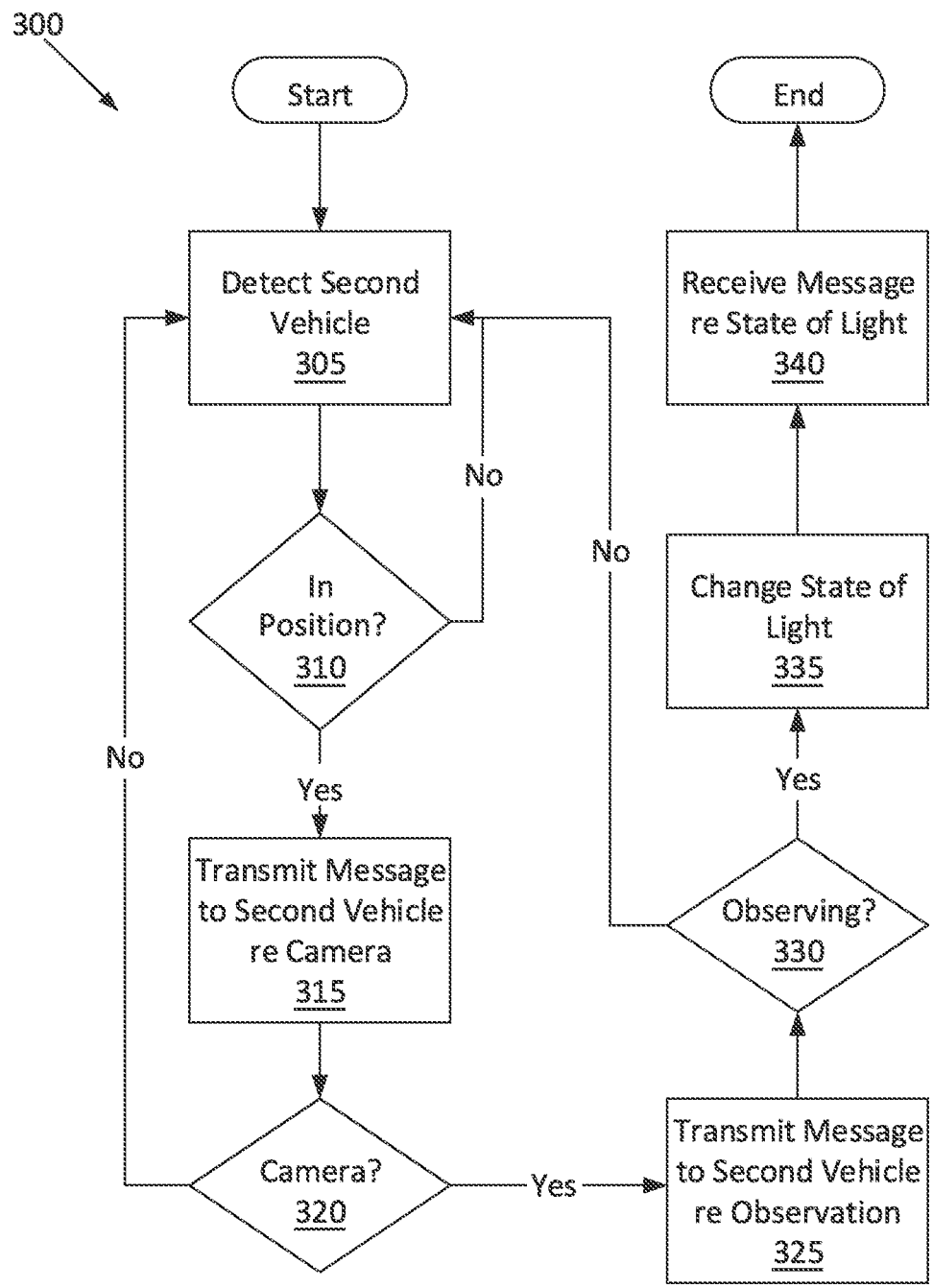
FIG. 3 is a process flow diagram of an exemplary process for diagnosing a light of the first vehicle of FIG. 1.

FIG. 3 is a process flow diagram illustrating an exemplary process 300 for diagnosing the light 32, 34, 36 of the first vehicle 30. The process 300 begins in a block 305, in which the controller 42 detects the second vehicle 38. Specifically, the sensors 50 transmit data through the communications network 52 to the controller 42. The controller 42, using known techniques, determines, based on the data, the presence, current location, and expected location of the second vehicle 38.

Figure 6:
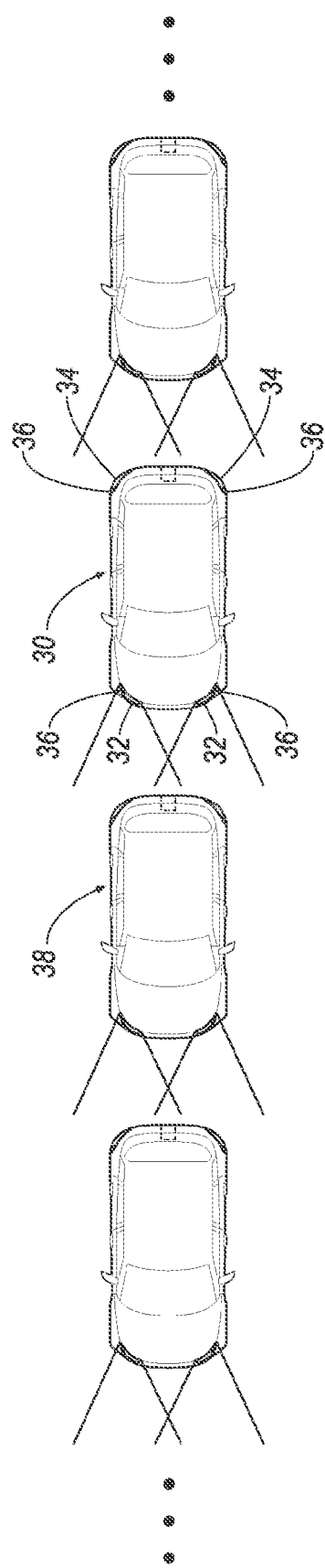
FIG. 6 is a diagram of the second vehicle of FIG. 4 positioned relative to the first vehicle of FIG. 1 in a platoon of autonomous vehicles.

Next, in a decision block 310, the controller 42 determines whether the second vehicle 38 is positioned to sense the light 32, 34, 36 of the first vehicle 30. Specifically, the controller 42 determines whether the second vehicle 38 is in a testing position relative to the light 32, 34, 36 of the first vehicle 30 and will remain in that testing position for a long enough time to complete the process 300, that is, whether the testing position is stable for a testing duration. An example of a stable testing position for the adaptive headlights 32 is that the first vehicle 30 is stopped and the second vehicle 38 is stopped in front of the first vehicle 30, as shown in FIG. 4. Additionally, the controller 42 may determine that the first vehicle 30 and the second vehicle 38 are stopped at a red stoplight and that the stoplight will remain red for at least the testing duration. An example of a stable testing position for the brakelights 34 is that the first vehicle 30 is stopped and the second vehicle 38 is stopped behind the first vehicle 30, as shown in FIG. 5. Again, the controller 42 may additional determine that the first vehicle 30 and the second vehicle 38 are stopped at a red stoplight and that the stoplight will remain red for at least the testing duration. In these two examples, the first vehicle 30 may be autonomous, and the controller 42 may determine an expected future position of the second vehicle 38 in the course of autonomously operating the first vehicle 30. If the first vehicle 30 is autonomous, another example of a stable testing position for all the lights 32, 34, 36 is that the second vehicle 38 is adjacent the first vehicle 30 in a platoon of autonomous vehicles, as shown in FIG. 6. A "platoon" is a group of vehicles that are traveling together in a coordinated manner and that are equipped to substantially simultaneously brake. A fourth example of a stable testing position for any of the lights 32, 34, 36 is that the second vehicle 38 is an aerial drone (not shown), rather than a motor vehicle as in the previous examples. The first vehicle 30 may be moving or stationary, and the second vehicle 38 may be hovering in a constant position relative to the first vehicle 30. The controller 42 of the first vehicle 30 may be instructing the second vehicle 38 where to travel, or the second vehicle 38 may be acting independently of the first vehicle 30. If the second vehicle 38 is not positioned to sense the light 32, 34, 36 of the first vehicle 30, the process 300 returns to the block 305, in which the controller 42 detects another second vehicle 38.

If the second vehicle 38 is positioned to sense the light 32, 34, 36 of the first vehicle 30, next, in a block 315, the controller 42 transmits a message to the second vehicle 38 asking whether the second vehicle 38 has a camera 60 facing the light 32, 34, 36. The camera 60 is "facing" an object if the camera 60 is aimed such that the object is in a field of vision of the camera 60. Specifically, the controller 42 instructs the transmitter 54 to send the message.

Next, in a decision block 320, the controller 42 determines whether the second vehicle 38 has the camera 60 facing the light 32, 34, 36 based on a reply message from the second vehicle 38. If the second vehicle 38 does not have the camera 60 facing the light 32, 34, 36, then the process 300 returns to the block 305, in which the controller 42 detects another second vehicle 38.

If the second vehicle 38 does have the camera 60 facing the light 32, 34, 36, next, in a block 325, the controller 42 transmits a message to the second vehicle 38 requesting observation of the light 32, 34, 36, that is, that the camera 60 record images or video of the light 32, 34, 36.

Next, in a decision block 330, the controller 42 determines whether the camera 60 of the second vehicle 38 will observe the light 32, 34, 36. Specifically, the controller 42 receives a message from the second vehicle 38 indicating whether the second vehicle 38 is instructing the camera 60 to observe the light 32, 34, 36. If the second vehicle 38 declines, that is, if the camera 60 of the second vehicle 38 will not observe the light 32, 34, 36, then the process 300 returns to the block 305, in which the controller 42 detects another second vehicle 38.

If the second vehicle 38 accepts, that is, if the camera 60 of the second vehicle 38 will observe the light 32, 34, 36, next, in a block 335, the controller 42 actuates the light 32, 34, 36 to change state in response to the message from the second vehicle 38 indicating observation. For example, the controller 42 may actuate the adaptive headlights 32 to rotate right relative to the first vehicle 30 by an angle θ and then rotate left relative to the first vehicle 30 by an angle 2θ before returning to a centered state, e.g., aligned with the longitudinal axis L of the first vehicle 30. For another example, the controller 42 may actuate the brakelights 34 to change to dim and then to bright. For a third example, the controller 42 may actuate the turn signals 36 to begin blinking.

Next, in a block 340, the controller 42 receives a message from the second vehicle 38 specifying a state of the light 32, 34, 36. The second vehicle 38 may use image analysis techniques, e.g., a known technique such as image subtraction analysis, to determine a change in state of the light 32, 34, 36, for example, the adaptive headlights 32 rotating, the brakelights 34 changing from off to bright, the turn signals 36 changing from off to blinking, etc. Then, the second vehicle 38 may send a message indicating that the light 32, 34, 36 did or did not change from a particular state to a particular state. Alternatively, the second vehicle 38 may send a sequence of images to the controller 42. The controller 42 may then use a known technique such as image subtraction analysis to determine whether the light 32, 34, 36 did or did not change state. With that determination, the controller 42 determines the operability of the light 32, 34, 36. After the block 340, the process 300 ends.

Figure 7:
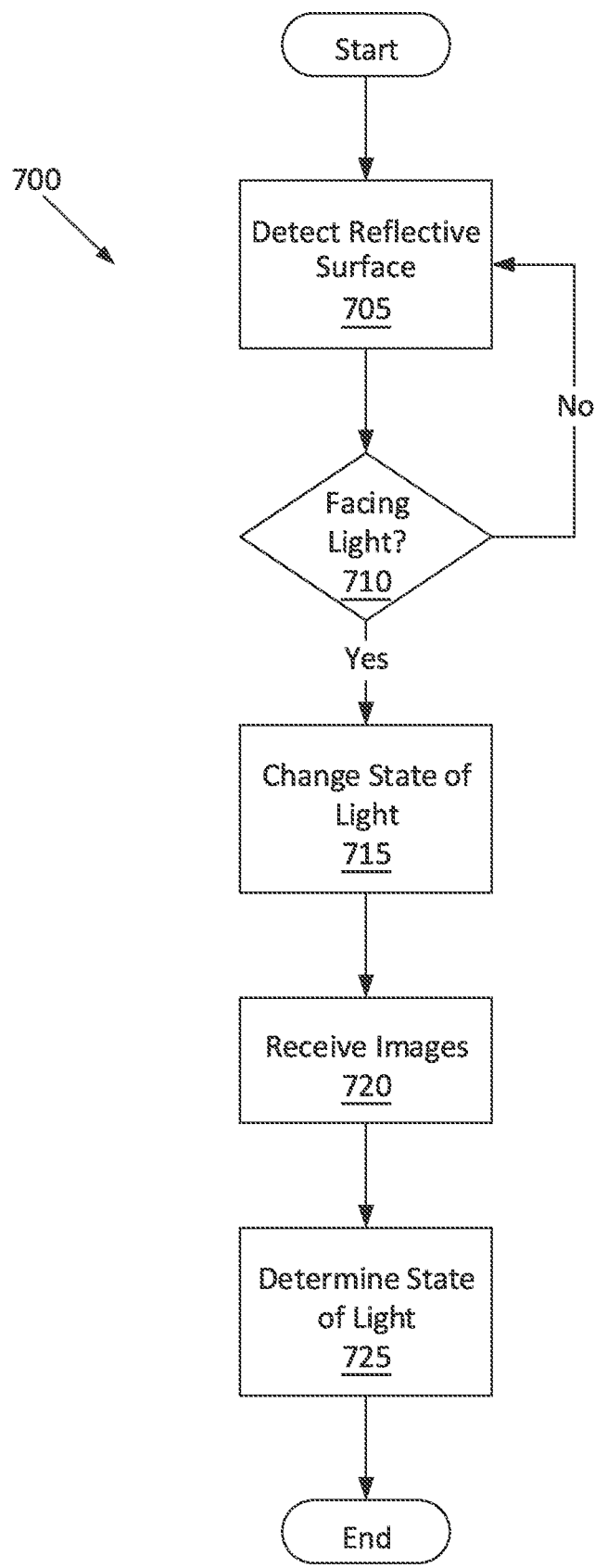
FIG. 7 is a process flow diagram of another exemplary process for diagnosing the light of the first vehicle of FIG. 1.
Figure 8:
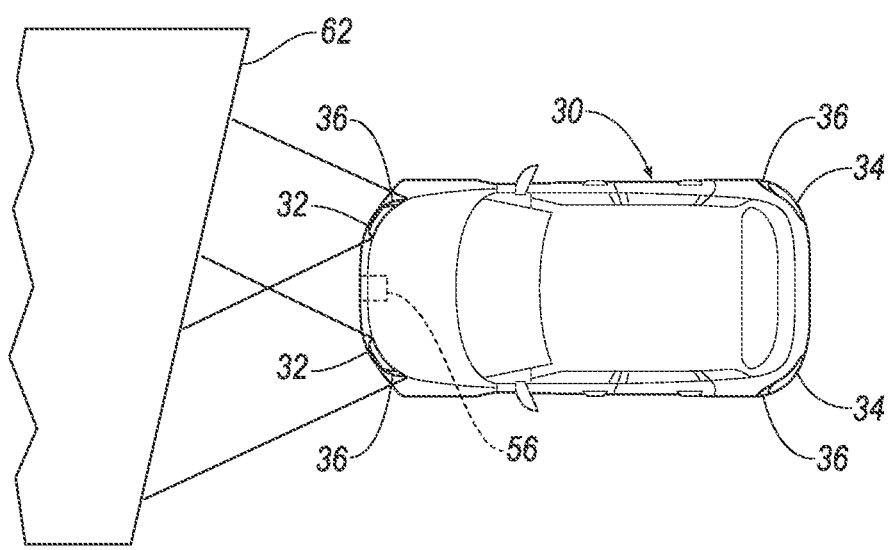
FIG. 8 is a diagram of a reflective surface facing the light of the first vehicle of FIG. 1.

FIG. 7 is a process flow diagram illustrating another exemplary process 700 for diagnosing the light 32, 34, 36 of the first vehicle 30. The process 700 begins in a block 705, in which the controller 42 detects a reflective surface 62, as shown in FIG. 8. A surface is reflective if the cameras 56 are able to detect light from a light source such as the lights 32, 34, 36 reflected by the surface with a high degree of confidence. For example, a mirror may be a reflective surface 62. For another example, a flat wall may be a reflective surface 62 at night when ambient light is low but not a reflective surface 62 in daylight.

Next, in a decision block 710, the controller 42 determines whether the reflective surface 62 is facing the light 32, 34, 36 of the first vehicle 30. The reflective surface 62 is "facing" the light 32, 34, 36 if the reflective surface 62 reflects light from the light 32, 34, 36 back toward the first vehicle 30 such that the field of vision of the camera 56 of the first vehicle 30 encompasses the reflected light. If the reflective surface 62 is not facing the light 32, 34, 36 of the first vehicle 30, then the process 700 returns to the block 705, in which the controller 42 detects another reflective surface 62.

If the reflective surface 62 is facing the light 32, 34, 36 of the first vehicle 30, next, in a block 715, the controller 42 actuates the light 32, 34, 36 to change state, as described above with respect to the block 335 of the process 300.

Next, in a block 720, the controller 42 receives images of the reflective surface 62 from the camera 56 of the first vehicle 30. The images may be video or a sequence of still images.

Next, in a block 725, the controller 42 determines a state of the light 32, 34, 36 based on the images. Determining the state of the light 32, 34, 36 based on the images may include performing, e.g., image subtraction analysis to determine a change in state of the light 32, 34, 36, for example, the adaptive headlights 32 rotating, the brakelights 34 changing from off to bright, the turn signals 36 changing from off to blinking, etc. Then, the controller 42 may determine that the light 32, 34, 36 did or did not change from a particular state to a particular state. With that determination, the controller 42 determines the operability of the light 32, 34, 36. After the block 725, the process 700 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A controller programmed to:
   detect a second vehicle positioned to sense a first vehicle light;
   transmit a first message to the second vehicle requesting observation of the light;
   actuate the light to change a state in response to a second message from the second vehicle; and
   receive a third message from the second vehicle specifying a state of the light.

2. The controller of claim 1, wherein the light is an adaptive headlight rotatable relative to the first vehicle, and the specified state is an angle of the light relative to the first vehicle.

3. The controller of claim 2, further programmed to transmit the first message to the second vehicle upon determining that the first vehicle is stopped and the second vehicle is stopped in front of the first vehicle.

4. The controller of claim 1, wherein the light is a brakelight, and multiple states of the light include bright and at least one of dim and off.

5. The controller of claim 4, further programmed to transmit the first message to the second vehicle upon determining that the first vehicle is stopped and the second vehicle is stopped behind the first vehicle.

6. The controller of claim 1, wherein the light is a turn signal, and multiple states of the light include blinking and off.

7. The controller of claim 1, further programmed to transmit the first message to the second vehicle upon determining that the second vehicle is adjacent the first vehicle in a platoon of autonomous vehicles.

8. The controller of claim 1, further programmed to transmit a fourth message to the second vehicle asking whether the second vehicle has a camera facing the light.

9. A first vehicle comprising:
a light; and
a controller in communication with the light and programmed to
detect a second vehicle positioned to sense the light;
transmit a first message to the second vehicle requesting observation of the light;
actuate the light to change state in response to a second message from the second vehicle; and
receive a third message from the second vehicle specifying a state of the light.

10. The first vehicle of claim 9, wherein the light is an adaptive headlight rotatable relative to the first vehicle, and the specified state is an angle of the light relative to the first vehicle.

11. The first vehicle of claim 10, wherein the controller is further programmed to transmit the first message to the second vehicle upon determining that the first vehicle is stopped and the second vehicle is stopped in front of the first vehicle.

12. The first vehicle of claim 9, wherein the light is a brakelight, and multiple states of the light include bright and at least one of dim and off.

13. The first vehicle of claim 12, wherein the controller is further programmed to transmit the first message to the second vehicle upon determining that the first vehicle is stopped and the second vehicle is stopped behind the first vehicle.

14. The first vehicle of claim 9, wherein the light is a turn signal, and multiple states of the light include blinking and off.

15. The first vehicle of claim 9, wherein the controller is further programmed to transmit the first message to the second vehicle upon determining that the second vehicle is adjacent the first vehicle in a platoon of autonomous vehicles.

16. The first vehicle of claim 9, wherein the controller is further programmed to transmit a fourth message to the second vehicle asking whether the second vehicle has a camera facing the light.

17. A controller programmed to:
detect a reflective surface facing a light of a vehicle;
actuate the light to change state;
receive images of the reflective surface from a camera of the vehicle; and
determine a state of the light based on the images.

18. The controller of claim 17, wherein the light is an adaptive headlight rotatable relative to the vehicle, and the specified state is an angle of the light relative to the vehicle.

19. The controller of claim 17, wherein the light is a brakelight, and multiple states of the light are bright and at least one of dim and off.

20. The controller of claim 17, wherein determining the state of the light based on the images includes performing image subtraction analysis on the images.

* * * * *